United States Patent
Barkan et al.

(10) Patent No.: US 12,052,404 B2
(45) Date of Patent: Jul. 30, 2024

(54) DIGITAL WATERMARK ENABLED SCANNER WITH WHITE ILLUMINATION SOURCE

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 11 days.

(21) Appl. No.: 17/872,688

(22) Filed: Jul. 25, 2022

(65) Prior Publication Data
US 2024/0031511 A1  Jan. 25, 2024

(51) Int. Cl.
*G06K 7/10* (2006.01)
*G06K 7/14* (2006.01)
*H04N 1/60* (2006.01)

(52) U.S. Cl.
CPC ....... *H04N 1/6044* (2013.01); *G06K 7/10732* (2013.01); *G06K 7/1092* (2013.01); *G06K 7/1408* (2013.01); *G06K 7/1447* (2013.01)

(58) Field of Classification Search
None
See application file for complete search history.

(56) References Cited

U.S. PATENT DOCUMENTS

| | | | |
|---|---|---|---|
| 2017/0046605 A1* | 2/2017 | Asthana | G06K 7/1417 |
| 2019/0297219 A1* | 9/2019 | Santi | G06V 10/25 |
| 2019/0385034 A1* | 12/2019 | Evans | G06Q 10/08 |

OTHER PUBLICATIONS

Digimarc Corp. "Zebra Technologies Adopts Digimarc Barcode to Boost Front-of-Store Efficiency for Retailer". Press release. Jul. 20, 2016 On the Digimarc Corp. website. https://www.digimarc.com/press-releases/2016/07/20/zebra-technologies-adopts-digimarc-barcode-boost-front-store-efficiency (Year: 2016).*

* cited by examiner

*Primary Examiner* — Suezu Ellis
(74) *Attorney, Agent, or Firm* — Yuri Astvatsaturov

(57) ABSTRACT

Imaging devices for imaging or scanning objects using white light are described herein. An example imaging device includes: an imaging assembly having a field of view (FOV) and disposed along an imaging axis to receive reflected light from an object in the FOV, including: an optical element, disposed along the imaging axis of the imaging assembly to receive the reflected light from the object, and a filtering element, disposed to receive at least a subset of the reflected light, the filtering element configured to transmit a first portion of the subset of the reflected light as filtered light and absorb a second portion of the subset of the reflected light, the filtered light comprising wavelengths of light in a predetermined set of wavelengths; a monochrome sensor disposed to receive the filtered light; and a microprocessor that decodes an indicia after receiving the filtered light at the monochrome sensor.

23 Claims, 11 Drawing Sheets

DIGITAL WATERMARK ENABLED SCANNER WITH WHITE ILLUMINATION SOURCE

BACKGROUND

Bioptic scanners have long been used to capture barcode data which is then used to look up the price of the item scanned. Barcode scanning is traditionally performed with monochromatic imaging. In other words, both the camera and the illumination source operate within a narrow bandwidth of the electromagnetic spectrum. Lasers are typically used as the illumination source to achieve this narrow bandwidth. Barcode scanning with monochrome imaging is cost effective and is traditionally performed in the red region of the visible electromagnetic spectrum because of traditional barcode designs and for improved performance with infrared illumination for use in security fields. However, while bioptic scanners began as laser based systems, they have evolved into digital or camera based systems.

Digital or camera based bioptic imagers may be used for item recognition purposes. Contrary to barcode scanning, however, item recognition is typically performed with multicolor imaging. In other words, both the camera and the illumination source operate within a broad region of the visible spectrum.

SUMMARY

In an embodiment, an imaging engine for imaging and decoding watermark and non-watermark barcodes. The imaging engine includes: (i) a light source configured to emit output light such that the output light provides a substantially white appearance to a user; (ii) an imaging assembly having a field of view (FOV) and disposed along an imaging axis to receive reflected light from an object in the FOV, the object being illuminated by the output light emitted by the light source, and the imaging assembly including: (1) an optical element, disposed along the imaging axis of the imaging assembly to receive the reflected light from the object, and (2) a filtering element, disposed to receive at least a subset of the reflected light, the filtering element configured to transmit a first portion of the subset of the reflected light as filtered light and absorb a second portion of the subset of the reflected light, the filtered light having a wavelength of at least 600 nm; (iii) a monochrome sensor disposed to receive the filtered light and to generate image data based on receiving the filtered light; and (iv) a microprocessor and computer-readable media storing machine readable instructions, the microprocessor configured to: (a) responsive to detecting a first finder pattern associated with a non-watermark indicia associated with the object, process at least a first subset of the image data using a first decode operation configured to decode non-watermark indicia to obtain a first decoded payload; and (b) responsive to detecting a second finder pattern associated with a watermark indicia associated with the object, process at least a second subset of the image data using a second decode operation configured to decode watermark indicia to obtain a second decoded payload.

In a variation of the embodiment, the filtering element includes at least one of: a plastic filter; a glass filter; a sticker applied to the optical element; a lens coating applied to the optical element; a lens molded from filtering material; or a dichroic mirror along the imaging axis.

In another variation of the embodiment, the optical element includes a scan window, the scan window including a section through which at least the subset of the reflected light passes.

In a further variation of the embodiment, the filtering element includes at least one of: (i) a sticker applied to the section of the scan window through which the reflected light passes, (ii) a coating applied to the section of the scan window through which the reflected light passes, and (iii) at least part of the scan window, wherein the at least part of the scan window is molded from a filtering material.

In another variation of the embodiment, the light source comprises three illumination sources that each emit a distinct wavelength at a respective predetermined intensity and the output light is a combined output of the three illumination sources.

In yet another variation of the embodiment, the watermark indicia is a Digimarc watermark and the filtered light has a wavelength in a range of 620 nm to 750 nm.

In a further variation of the embodiment, the second decode operation is a decode operation associated with a library for the Digimarc watermark.

In another variation of the embodiment, the subset of the reflected light is a first subset of the reflected light and the imaging device further comprises: a color sensor disposed such that the color sensor receives a second subset of the reflected light different than the first subset of the reflected light; further, the second subset of the reflected light includes unfiltered light.

In a further variation of the embodiment, the imaging assembly further includes: a first shutter component disposed such that, when closed, the first shutter component prevents the first subset of light from reaching the monochrome sensor and allows the second subset of light to reach the color sensor; and a second shutter component disposed such that, when closed, the second shutter component prevents the second subset of light from reaching the color sensor and allows the first subset of light to reach the monochrome sensor; further, the first shutter component is open during a scanning time window and the second shutter component is open during an imaging time window.

In a still further variation of the embodiment, the scanning time window and the imaging time window at least partially overlap.

In yet a still further variation of the embodiment, the scanning time window and the imaging time window are disparate time windows, and the light source is configured to emit the output light at a first intensity during the scanning time window and emit the output light at a second intensity during the imaging time window.

In a further variation of the embodiment, the FOV of the imaging assembly is a composite FOV comprised of a first FOV associated with the monochrome sensor and a second FOV associated with the color sensor, and the first FOV at least partially overlaps the second FOV.

In another embodiment, a barcode scanning platform having a field of view (FOV) and for decoding watermark and non-watermark barcodes in the FOV is provided. The barcode scanning platform includes: (i) a housing; (ii) a light source positioned at least partially within the housing and configured to emit output light such that the output light provides a substantially white appearance to a user; (iii) an imaging assembly positioned at least partially within the housing, having the FOV, and disposed along an imaging axis to receive reflected light from at least one barcode in the FOV, the barcode being illuminated by the output light emitted by the light source and the imaging assembly including: (1) an optical element, disposed along the imaging axis of the imaging assembly to receive the reflected light from the at least one barcode, and (2) a filtering element, disposed to receive at least a subset of the reflected light, the filtering element configured to transmit a first portion of the subset of the reflected light as filtered light and absorb a second portion of the subset of the reflected light, the filtered light having a wavelength of at least 600 nm; (iv) a monochrome sensor positioned at least partially within the housing and disposed to receive the filtered light and to generate image data based on receiving the filtered light; and (v) a microprocessor and computer-readable media positioned at least partially within the housing and storing machine readable instructions, the microprocessor configured to: (a) responsive to detecting a first finder pattern indicating that the barcode is associated with a non-watermark indicia, process at least a first subset of the image data using a first decode operation configured to decode non-watermark indicia to obtain a first decoded payload; and (b) responsive to detecting a second finder pattern indicating that the barcode is associated with a watermark indicia, process at least a second subset of the image data using a second decode operation configured to decode watermark indicia to obtain a second decoded payload.

In a variation of the embodiment, the filtering element includes at least one of: a plastic filter; a glass filter; a sticker applied to the optical element; a lens coating applied to the optical element; a lens molded from filtering material; or a dichroic mirror along the imaging axis.

In another variation of the embodiment, the optical element includes a scan window, the scan window including a section through which at least the subset of the reflected light passes.

In yet another variation of the embodiment, the filtering element includes at least one of: (i) a sticker applied to the section of the scan window through which the reflected light passes, (ii) a coating applied to the section of the scan window through which the reflected light passes, and (iii) at least part of the scan window, wherein the at least part of the scan window is molded from a filtering material.

In still yet another variation of the embodiment, the light source comprises three illumination sources that each emit a distinct wavelength at a respective predetermined intensity and the output light is a combined output of the three illumination sources.

In another variation of the embodiment, the watermark indicia is a Digimarc watermark and the filtered light has a wavelength in a range of 620 nm to 750 nm.

In another variation of the embodiment, the second decode operation is a decode operation associated with a library for the Digimarc watermark.

In still another variation of the embodiment, the subset of the reflected light is a first subset of the reflected light, and the barcode scanning platform further comprises: a color sensor positioned at least partially within the housing and disposed such that the color sensor receives a second subset of the reflected light different than the first subset of the reflected light; and the second subset of the reflected light includes unfiltered light.

In a further variation of the embodiment, the imaging assembly further includes: a first shutter component disposed such that, when closed, the first shutter component prevents light from reaching the monochrome sensor and allows light to reach the color sensor; and a second shutter component disposed such that, when closed, the second shutter component prevents light from reaching the color sensor and allows light to reach the monochrome sensor; and the first shutter component is open during a scanning time window and the second shutter component is open during an imaging time window.

In a still further variation of the embodiment, the scanning time window and the imaging time window at least partially overlap.

In still yet a further variation of the embodiment, the scanning time window and the imaging time window are disparate windows, and the light source is configured to emit the output light at a first intensity during the scanning time window and emit the output light at a second intensity during the imaging time window.

In a further variation of the embodiment, the FOV of the imaging assembly is a composite FOV comprised of a first FOV associated with the monochrome sensor and a second FOV associated with the color sensor, and the first FOV at least partially overlaps the second FOV.

In another embodiment, an imaging device for scanning Digimarc watermarks is provided. The imaging device includes: (i) a light source configured to emit an output light pulse and comprising three illumination sources that each emit a distinct wavelength at a respective predetermined intensity, such that a combined output of the three illumination sources causes the output light pulse to provide a substantially white appearance to a user; (ii) an imaging assembly having a field of view (FOV) and disposed along an imaging axis to receive reflected light from the Digimarc watermark in the FOV, the Digimarc watermark being illuminated by the output light pulse, and the imaging assembly including: (1) an optical element, disposed along the imaging axis of the imaging assembly to receive the reflected light from the object, and (2) a filtering element, disposed to receive at least a subset of the reflected light, the filtering element configured to transmit a first portion of the subset of the reflected light as filtered light and absorb a second portion of the subset of the reflected light, the filtered light having a wavelength of at least 600 nm; (iii) a monochrome sensor disposed to receive the filtered light and to generate image data based on receiving the filtered light; and (iv) a microprocessor and computer-readable media storing machine readable instructions, the microprocessor configured to: (a) responsive to detecting a finder pattern associated with the Digimarc watermark, process at least a subset of the image data using a decode operation configured to decode Digimarc watermarks to obtain a decoded payload.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
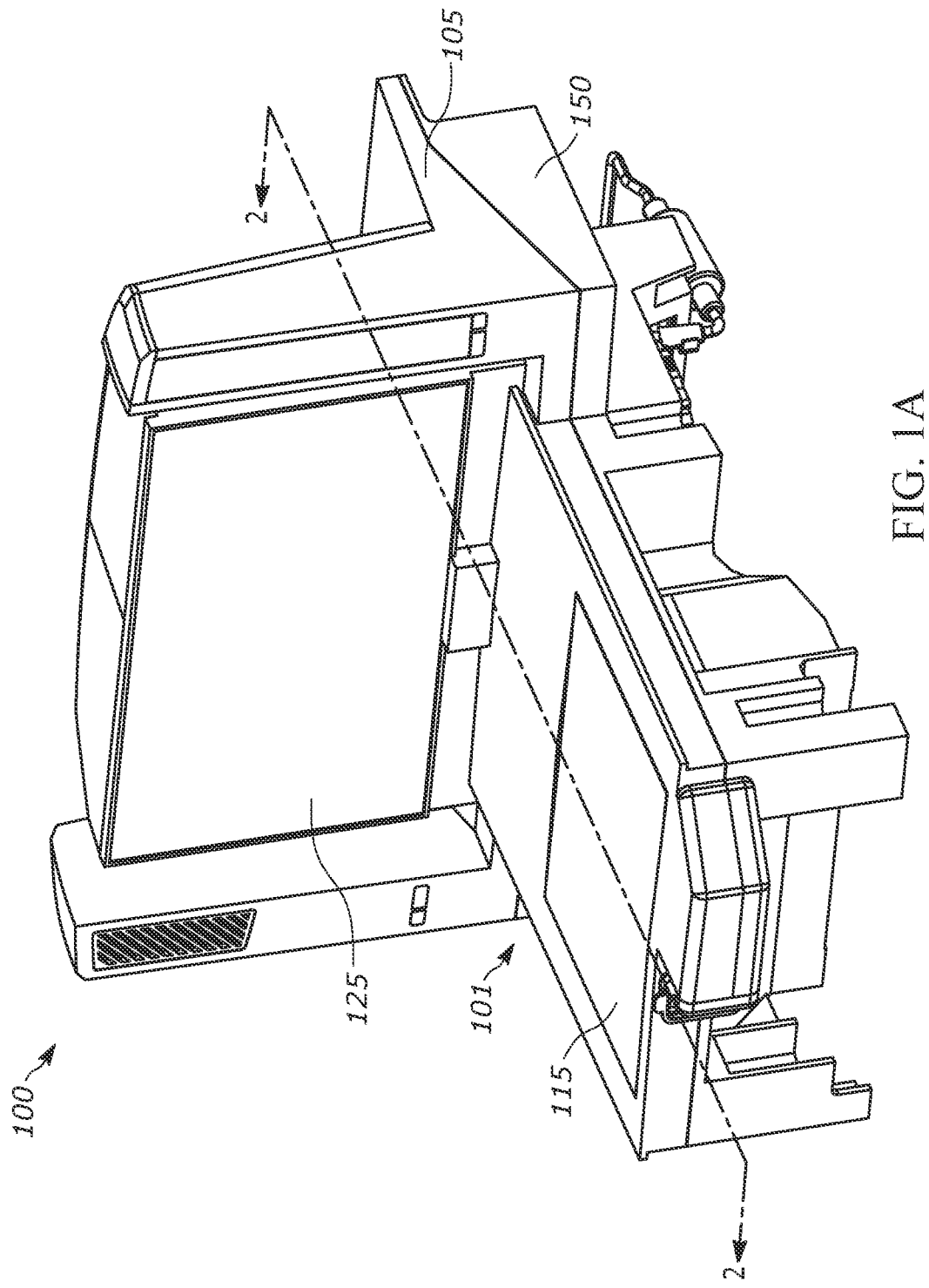
FIG. 1A illustrates a perspective view of a first example bioptic barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Traditional bioptic barcode readers and other such imaging devices do not possess the ability to perform both monochrome and multicolor imaging. Where techniques exist that allow for both monochrome and multicolor imaging, the imaging device reader requires multiple light sources corresponding to the multiple scanners. Accordingly, there is a need for solutions that solve issues regarding scanners that cannot provide both monochromatic and multicolor illumination or do so using multiple light sources.

In various embodiments of the present disclosure, an imaging device, and related methods, are described for use of proper illumination color to capture appropriate data. The imaging device, and related methods, of the present disclosure provide solutions where, e.g., an imaging device is required to capture both barcode and object image data. Further, red light has had harsh effects on individuals experiencing the light. For example, red light can make people feel ill or cause PTSD attacks. Industries sensitive to such concerns, such as the healthcare industry, are unable to fully utilize imaging devices that rely on emitting red light. As such, in various further embodiments of the present disclosure, an imaging device, and related methods, are described for a reader to emit light that is or appears substantially white while still capturing monochromatic and/or multicolor light as appropriate.

For example, when the imaging device activates to capture barcode data or image data, the monochromatic sensor may not register a barcode or a digital watermark when receiving light that is or appears substantially white. However, the introduction of a filtering element in the imaging device allows for the monochromatic sensor to receive red light at the monochrome sensor and white or substantially white light at the color sensor.

Moreover, using a color sensor to read barcode data or other such indicia data introduces additional problems into the system, namely through the requirement of a Bayer filter to properly process the light. For monochromatic light, the Bayer filter used in the color sensor leads to reduced resolution, as some of the RGB pixels of the Bayer filter do not properly interact with the monochromatic light. Further, using white or substantially white light for the barcode or indicia decoding leads to increased processing time and additional required resources. Similarly, monochrome sensors cannot properly distinguish the multiple colors in the white or substantially white light.

Other benefits may be realized from incorporating both a system for providing light to both a monochrome sensor and a color sensor by introducing a filtering element into the imaging device. For example, the imaging device of the present application may be smaller, cheaper, and/or less energy intensive due to the obviation of a need for multiple light sources while still maintaining equivalent results.

Figure 1B:
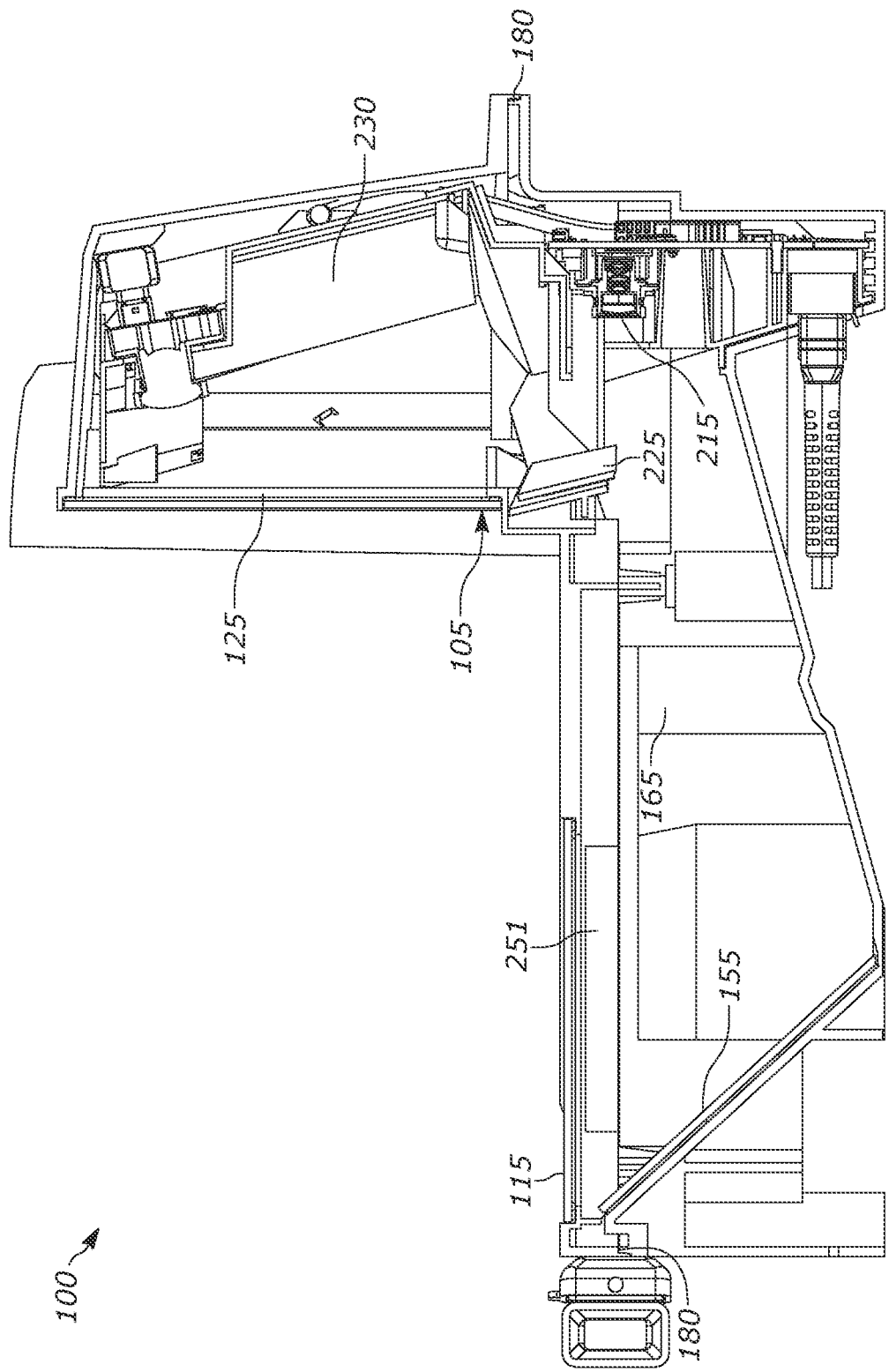
FIG. 1B illustrates a side view of the bioptic barcode reader of FIG. 1A.
Figure 1C:
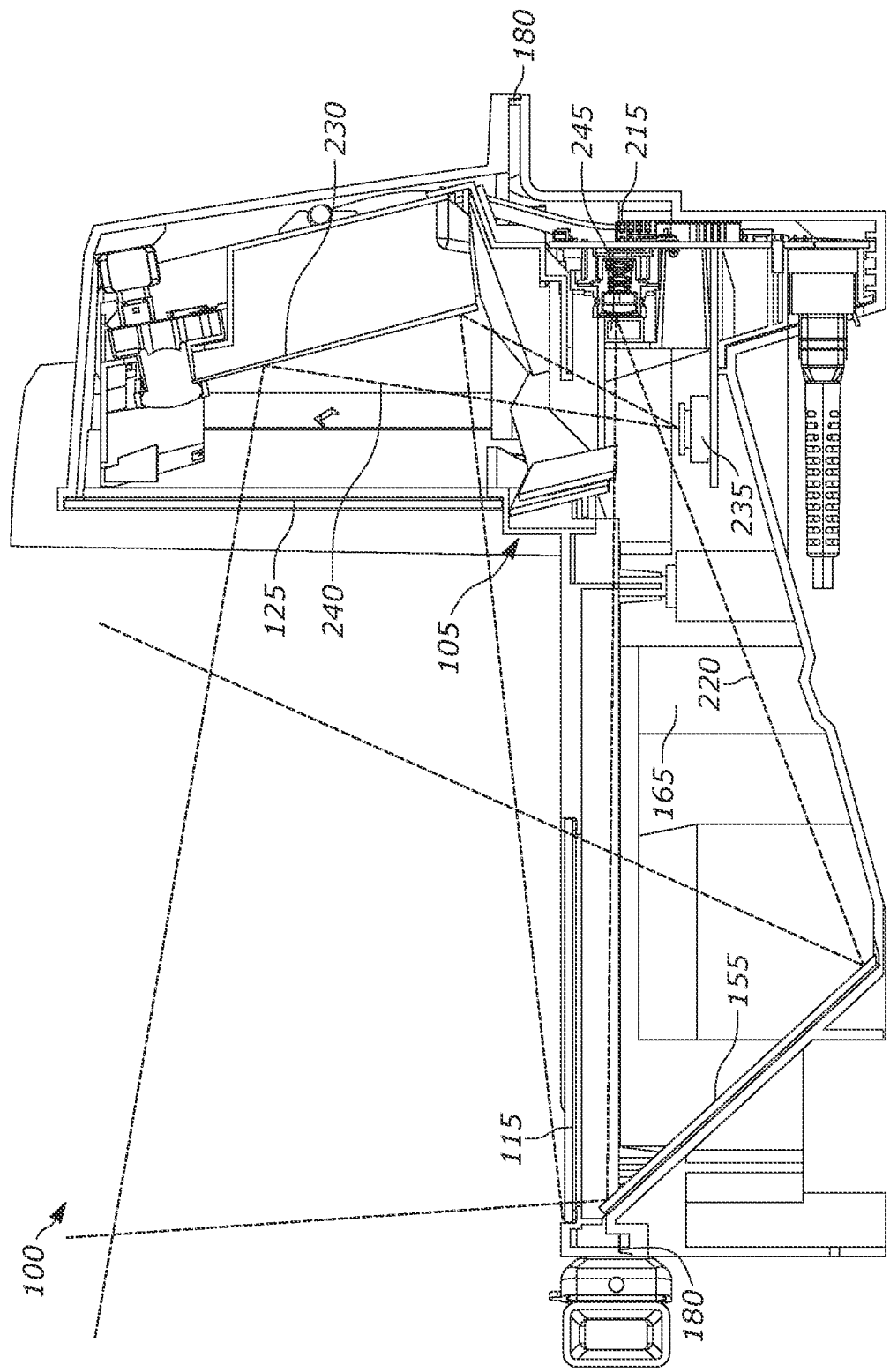
FIG. 1C illustrates the fields-of-view (FOVs) of imaging devices in a side view of the bioptic barcode reader of FIG. 1A.

Referring first to FIGS. 1A-1C, an example bioptic barcode reader 100 is shown that includes a housing assembly 101 with an upper housing 105 and a lower housing 150, which together define an interior region 165 of bioptic barcode reader 100. Lower housing 150 is secured directly to upper housing 105, for example with threaded members, without any intermediate housing portion positioned between upper housing 105 and lower housing 150. A seal 180 can be positioned between upper housing 105 and lower housing 150, which can minimize electrostatic discharge and dust, and liquid from entering interior region 165.

As can be seen in FIG. 1B, bioptic barcode reader 100 can include various optical and electronic components, such as a monochromatic imaging sensor 215, at least one intermediate mirror 225, at least one vertical output mirror 230, and at least one horizontal output mirror 155 positioned in interior region 165. With this arrangement of components, intermediate mirror 225 is a splitter mirror and a field-of-view of imaging sensor 215 is split by intermediate mirror 225 into a first portion and a second portion, with the first portion being directed out of generally horizontal window 115 by horizontal output mirror 155 and the second portion being directed out of generally upright window 125 by vertical output mirror 230. Moreover, the bioptic barcode reader 100 may also include an illumination light source 251, which emits white or substantially white light towards an object through horizontal window 115. White or substantially white light may refer to white that appears white and/or off-white to a human user or observer. In some implementations, the illumination light source 251 includes a plurality of light sources that collectively make up the illumination light source 251. For example, the illumination light source 251 includes three light sources, such as LEDs or components of an LED, that emits light that each emit a distinct wavelength at a respective predetermined intensity, such that a combined output of the three light sources causes the output of the illumination light source 251 to provide a white appearance to a user. In further implementations, the illumination light source 251 emits light that includes wavelengths across the entire visible spectrum to appear white. In still further implementations, the illumination light source 251 emits light that includes wavelengths across a majority of the visible spectrum to have an off-white appearance.

In some implementations, the illumination light source 251 emits substantially white light through horizontal window 115 by directly emitting light through generally horizontal window 115 or by reflecting light using at least one horizontal output mirror 155. In other implementations, the illumination light source 251 is additionally or alternatively positioned to emit substantially white light through generally upright window 125, either directly or via optical elements such as at least one vertical output mirror 230.

As shown in the example shown in FIG. 1B, intermediate mirror 225 is a concave splitter mirror that directs one part of the second portion to a first vertical output mirror 230 and a second part of the second portion to a second vertical output mirror 230. Alternatively, intermediate mirror 225 could also be a convex splitter mirror that directs the second portion to two vertical output mirrors 230 or intermediate mirror 225 could be a planar splitter mirror that directs the entire second portion to a single vertical output mirror 230. In addition, the bioptic barcode reader 100 has a color imaging sensor 235, where a first field-of-view 220 of monochromatic imaging sensor 215 is directed out of generally horizontal window 115 by horizontal output mirror 155 and a second field-of-view 240 of color imaging sensor 235 is directed out of generally upright window 125 by vertical output mirror 230.

Further, in the example embodiment of FIG. 1C, the monochromatic imaging sensor 215 is disposed behind a filtering element 245, such that light from first FOV 220 passes through filtering element 245. As such, the monochromatic imaging sensor 215 only receives light within a particular wavelength range that passes through the filtering element. Depending on the implementation, the filtering element may be configured and/or manufactured to transmit light with a wavelength greater than 600 nm, light within a range of 600-700 nm, light considered to be red and/or infrared, etc. In some implementations, the filtering element 245 is also disposed in the bioptic barcode reader 100 such that the filtering element 245 does not intersect with the second FOV 240 for the color imaging sensor 235. As such, the color imaging sensor 235 receives unfiltered light while the monochromatic imaging sensor 215 receives filtered light. In further implementations, at least part of the filtering element 245 intersects with both the second FOV 240 and the first FOV 220, but only filters light in the first FOV 220.

While FIG. 1C depicts the filtering element 245 as being located directly adjacent to monochromatic sensor 215, it will be understood that the filtering element 245 may be located anywhere such that the filtering element 245 filters light in the first FOV 220 for the monochromatic imaging sensor 215. For example, in some implementations, the filtering element 245 is located within first FOV 220 and is a plastic filter, a glass filter, a lens molded from filtering material, or a dichroic mirror along the imaging axis. In further implementations, the filtering element 245 is part of an imaging assembly (e.g., the imaging assembly 244 in FIG. 2) and is at least one of a sticker applied to an optical element in the imaging assembly, a lens coating applied to an optical element in the imaging assembly, a lens molded from filtering material in the imaging assembly, or another optical element in the imaging assembly. In still further implementations, the filtering element 245 includes, is part of, is positioned adjacent to, or is at least one of generally horizontal window 115 and/or generally upright window 125. For example, depending on the implementation, the filtering element 245 is any of a sticker applied to the section of the generally horizontal window 115 and/or the generally upright window 125 through which the reflected light passes, a coating applied to the section of the generally horizontal window 115 and/or the generally upright window 125 through which the reflected light passes, or at least part of the generally horizontal window 115 and/or the generally upright window 125, molded from a filtering material. Similarly, filtering element 245 may be any similarly positioned and manufactured element for filtering light. Similarly, the filtering element 245 may be mounted within the housing assembly 101, part of an imaging assembly as described above, part of a window such as the generally horizontal window 115 and/or the generally upright window 125, part of the monochromatic imaging sensor 215, or any other similar positioning.

Although not required and not shown in FIGS. 1A-1C, bioptic barcode reader 100 can also include additional optical and electronic components, such as a vertical illumination printed circuit board, a user interface printed circuit board, a speaker, a color vision camera illumination printed circuit board, and an off-platter detection system printed circuit board.

Figure 2:
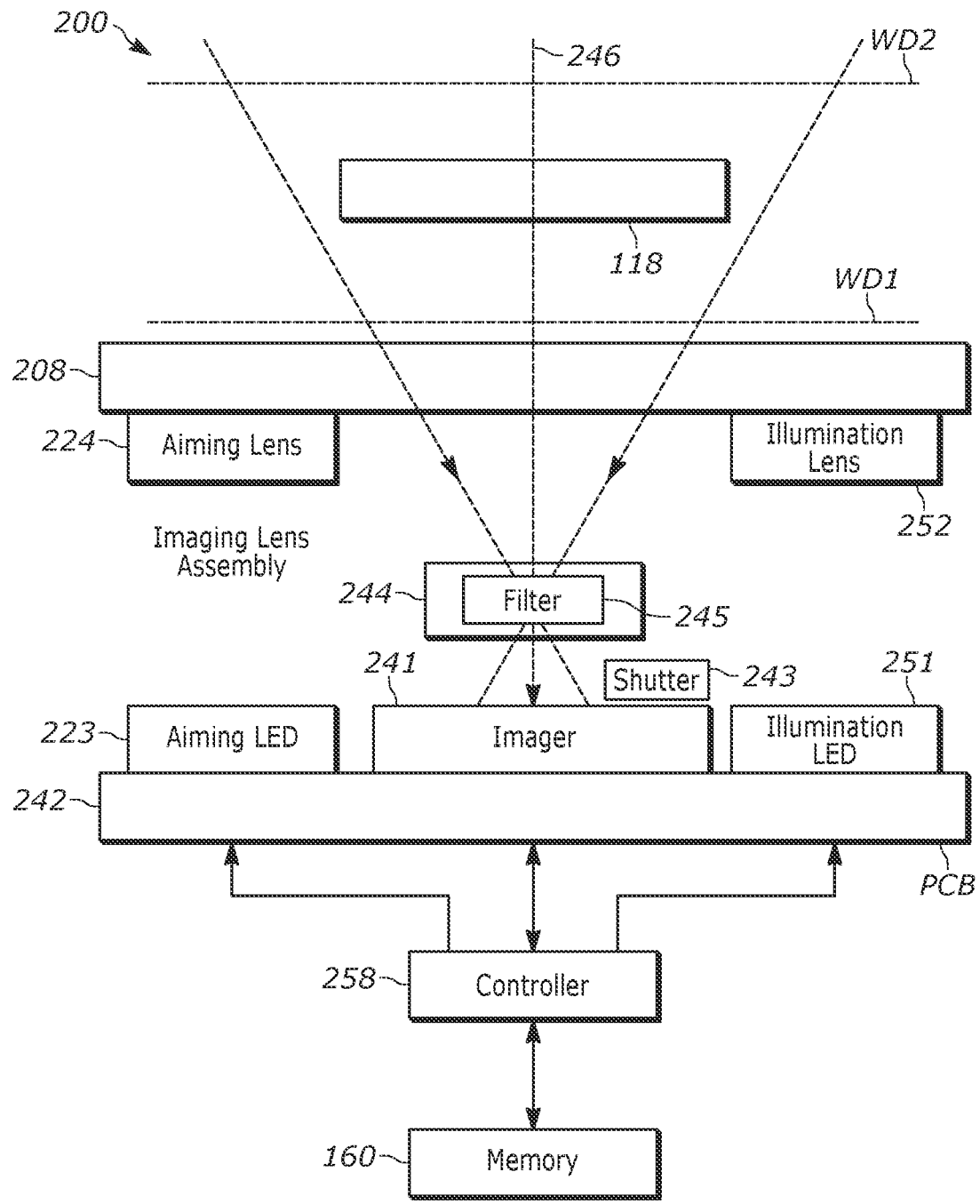
FIG. 2 illustrates a block diagram of an example imaging device such as the example bioptic barcode reader of FIG. 1A.

Referring next to FIG. 2, a block diagram of an example architecture for an imaging device such as bioptic barcode reader 100 is shown. For at least some of the reader embodiments, an imaging assembly includes a light-detecting sensor or imager 241 operatively coupled to, or mounted on, a printed circuit board (PCB) 242 in the imaging device 200 as shown in FIG. 2. In an embodiment, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 244 over a field of view along an imaging axis 246 through the window 208. The imager 241 may also include and/or function as a monochrome sensor and, in further implementations, a color sensor.

In some implementations, the imaging assembly 244 includes a filter element 245. The filter element 245 receives reflected light from an object in the FOV and filters the light passing through the filter. For example, the filter element 245 may prevent light with a wavelength below a certain threshold, such as wavelengths below 600 nm. As such, the filter element 245 may only allow red light to reach the imager 241 while absorbing, reflecting, and/or otherwise blocking other wavelengths. As such, the imager 241 may be and/or may include a monochrome sensor.

As discussed in detail above, a monochrome sensor does not operate efficiently and/or properly when receiving color light. As such, the introduction of the filtering element allows the use of a monochrome sensor in the imaging device 200 while emitting and receiving substantially white light. Further, the imager 241 may include a color sensor in addition to the monochrome sensor. In some such implementations, the filtering element 245 is disposed such that the filtering element 245 only filters light that reaches the monochrome sensor of the imager 241. As such, the monochrome sensor receives filtered light (e.g., red light) while the color sensor receives substantially white light. Therefore, because color sensors operate efficiently when receiving color light rather than red or otherwise filtered light, the introduction of the filtering element 245 allows for increased operation efficiency of both the monochrome sensor and the color sensor in the imager 241. It will be understood that, although imager 241 is depicted in FIG. 2 as a single block, that imager 241 may be multiple sensors spread out in different locations of imaging device 200.

In some implementations, the imager 241 is or includes the monochromatic imaging sensor 215. In further implementations, the imager 241 additionally or alternatively is or includes the color imaging sensor 235. The return light is scattered and/or reflected from an object 118 over the field of view. The imaging assembly 244 is operative for focusing the return light onto the array of image sensors to enable the object 118 to be read. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an embodiment, WD1 is about one-half inch from the window 208, and WD2 is about thirty inches from the window 208.

Depending on the implementation, the imaging assembly 244 includes the filtering element 245. In some implementations, the filtering element 245 is an individual element of the imaging assembly 244, such as a lens molded from filtering material (e.g., a translucent plastic with a red pigment filter dye). Similarly, depending on the implementation, the filtering element 245 is a plastic filter or a glass filter. In further implementations, the filtering element 245 is applied to elements of the imaging assembly 244, such as coatings and/or stickers applied to one or more elements of the lens assembly 244. It will be noted that, although FIG. 2 depicts filtering element 245 as part of imaging assembly 244, that filtering element 245 may be located elsewhere in imaging device 200, such as a coating, sticker, or part of window 208, as is described in more detail with regard to FIGS. 1A-1C above.

An illuminating light assembly may also be mounted in the imaging device 200. The illuminating light assembly includes an illumination light source 251, such as at least one light emitting diode (LED) and at least one illumination lens 252, and preferably a plurality of illumination LEDs and illumination lenses, configured to generate a substantially uniform distributed illumination pattern of illumination light on and along the object 118 to be read by image capture. At least part of the scattered and/or reflected return light is derived from the illumination pattern of light on and along the object 118. In some implementations, the illumination source 251 includes a light source that emits substantially white light, such as a white light LED. In further implementations, the illumination source 251 includes a plurality of light sources that collectively emit substantially white light or light that, in combination, appears white to the human eye. For example, the illumination source 251 may include a red LED, a blue LED, and a green LED that emit light in combination to appear white to the human eye.

An aiming light assembly may also be mounted in the imaging device 200 and preferably includes an aiming light source 223, e.g., one or more aiming LEDs or laser light sources, and an aiming lens 224 for generating and directing a visible aiming light beam away from the imaging device 200 onto the object 118 in the direction of the FOV of the imager 241.

Further, the imager 241, the illumination source 251, and the aiming source 223 are operatively connected to a controller or programmed microprocessor 258 operative for controlling the operation of these components. A memory 429 is connected and accessible to the controller 258. Preferably, the microprocessor 258 is the same as the one used for processing the captured return light from the illuminated object 118 to obtain data related to the object 118. Though not shown, additional optical elements, such as collimators, lenses, apertures, compartment walls, etc. are provided in the housing. Although FIG. 2 shows the imager 241, the illumination source 251, and the aiming source 223 as being mounted on the same PCB 242, it should be understood that different embodiments of the imaging device 200 may have these components each on a separate PCB, or in different combinations on separate PCBs. For example, in an embodiment of the imaging device 200, the illumination LED source is provided as an off-axis illumination (i.e., has a central illumination axis that is not parallel to the central FOV axis).

In some implementations, the illumination source 251 emits light at different intensities at different times. In some such implementations, the illumination source 251 emits light at a first intensity during a scanning window and at a second intensity during an imaging window. For example, the filtering element 245 may cause the received light to appear to be dimmer to the monochromatic imaging sensor 215. As such, when scanning an object 118 during a scanning window, the illumination source 251 may emit substantially white light at a proportionally higher intensity than light meant to be received by the color imaging sensor 235 during an imaging window. Depending on the implementation, the scanning window may overlap with the imaging window.

In other implementations, the illumination source 251 may emit light at the same intensity during the imaging window and the scanning window. In such implementations, the scanning window and the imaging window may be different lengths. In some such implementations, the imager 241 with the shorter window has a shutter 243 positioned such that the shutter closes to block light from reaching the respective imager 241, thus ending the window early. In further such implementations, the imager 241 with a shorter window receives light via a movable optical element, such as a mirror, and the movable optical element moves such that the light no longer reaches the imager 241 with the shorter window, ending the window early. In still further such implementations, both a monochromatic imaging sensor 215 and a color imaging sensor 235 are disposed behind a first shutter and a second shutter, respectively. The first shutter is open during a scanning window and the second shutter is open during an imaging window, allowing light to reach the monochromatic imaging sensor 215 and the color imaging sensor 235, respectively.

In some implementations, the object 118 is or includes an indicia for decoding, such as a barcode, a QR code, a label, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or scanned by an imaging device 200. In further implementations, the digital watermark is a Digimarc® watermark. In some further such implementations, the digital watermark can be decoded using a monochrome sensor such as monochrome imaging sensor 215 receiving red light or by a color sensor such as color imaging sensor 235 receiving substantially white light. In implementations in which the watermark is a Digimarc® watermark, the watermark is designed such that pixels in the watermark have contrast with neighboring pixels under red light. In further such implementations, the pixels in the watermark have a maximized contrast with red light, but have a level of contrast with other color light.

Although FIGS. 1A-1C depict an imaging device such as a bioptic barcode reader 100 in the form of a barcode scanning platform, it will be understood that further imaging devices may include architecture similar to imaging device 100 and bioptic barcode reader 100. For example, the imaging device may be and/or may include a handheld barcode reader, as described in more detail below with regard to FIGS. 3A-4C.

Figure 3A:
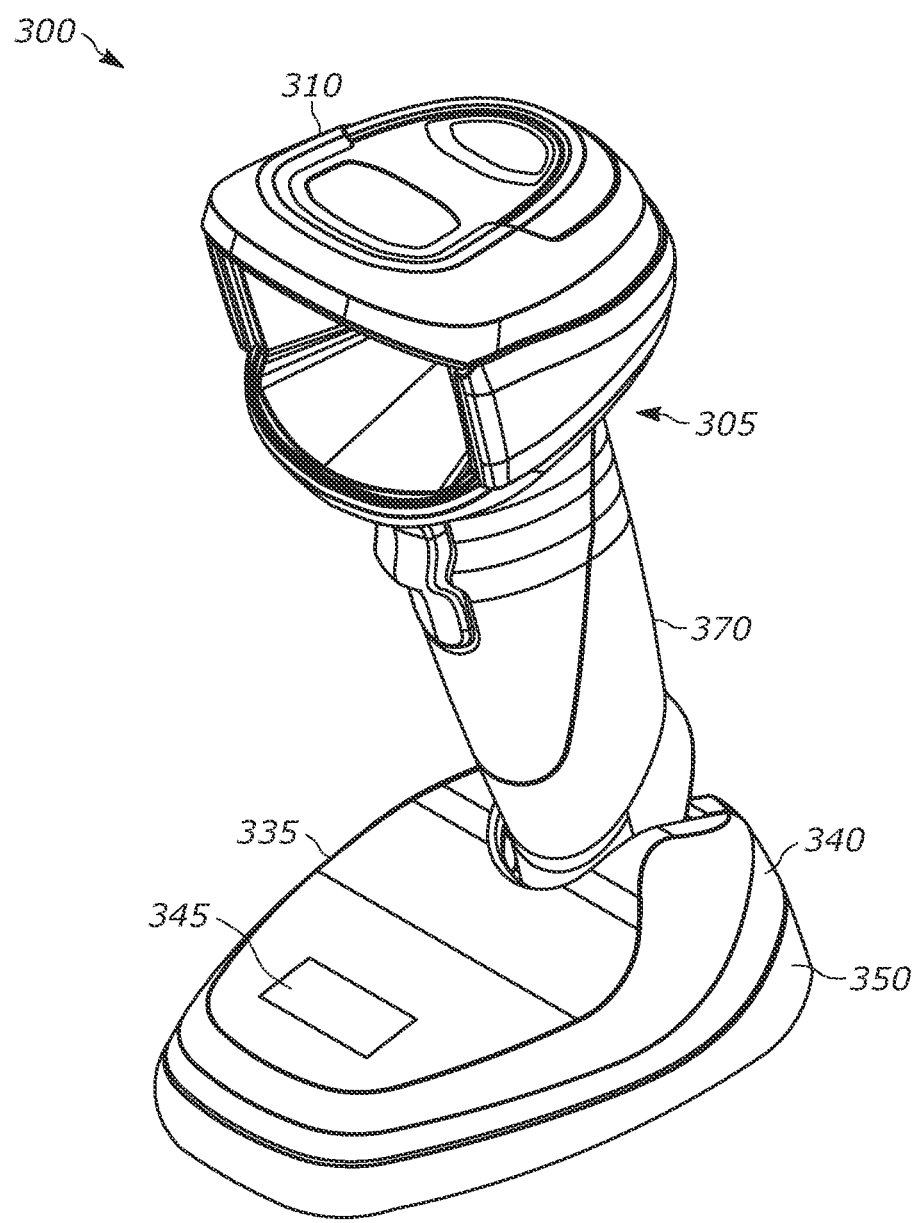
FIG. 3A illustrates a perspective view of a first example handheld barcode reader.
Figure 3B:
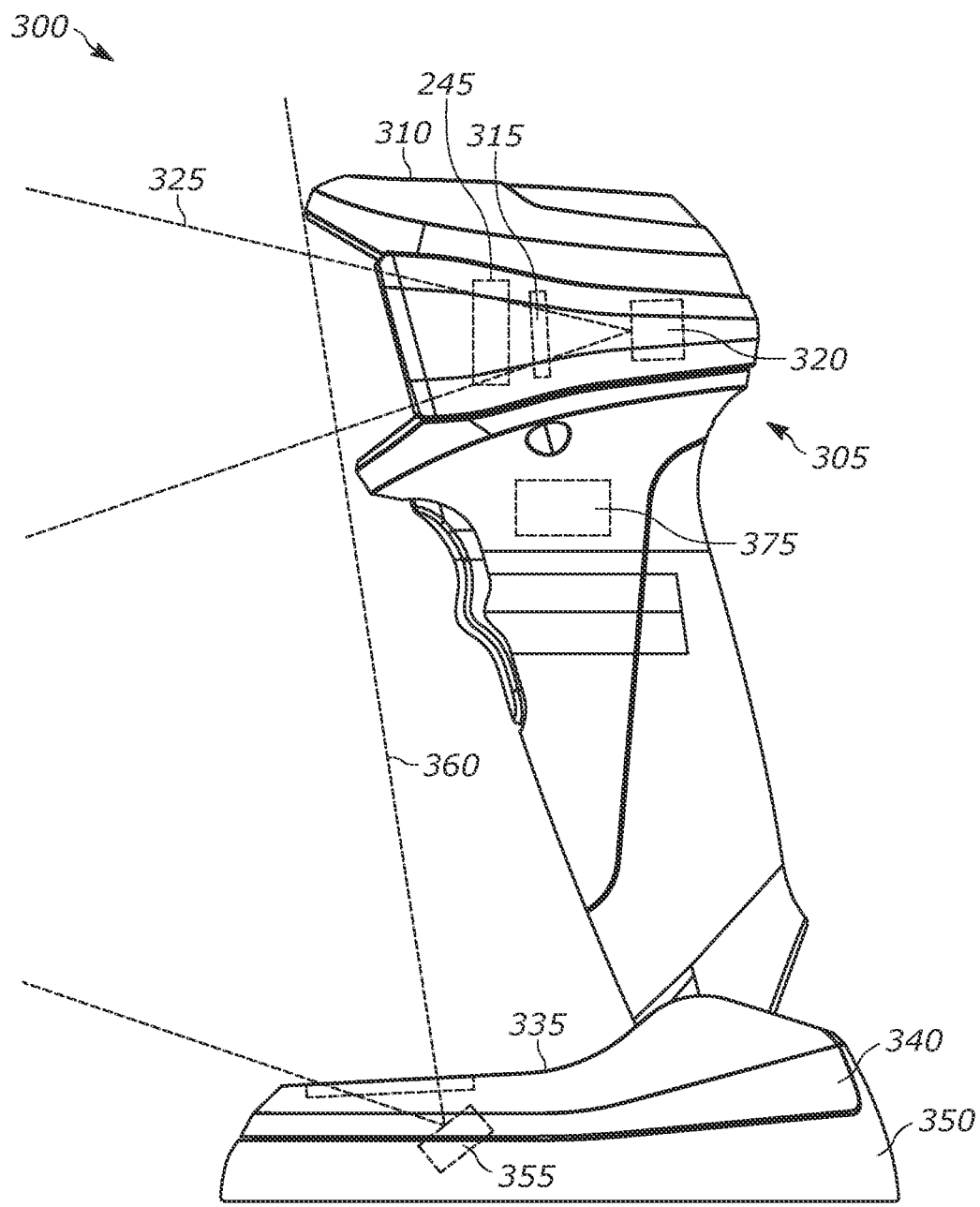
FIG. 3B illustrates a side view of the handheld barcode reader of FIG. 3A.
Figure 3C:
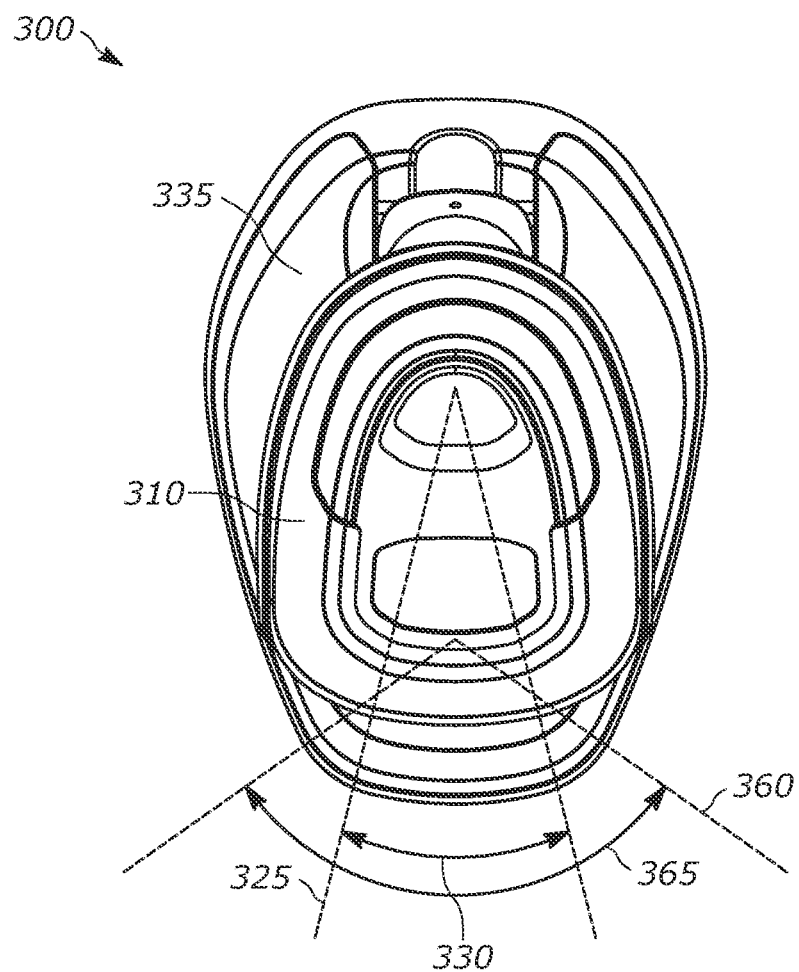
FIG. 3C illustrates a top view of the handheld barcode reader of FIG. 3A.

Referring to FIGS. 3A-3C, a first example handheld barcode reader 300 is illustrated. Handheld barcode reader 300 generally includes a housing 305 having a head portion 310 and a base portion 335. Base portion 335 includes an upper portion 340, a lower portion 350 removably attached to upper portion 340, and a base window 345 formed in upper portion 340. While lower portion 350 is shown as being separable from upper portion 340 in a horizontal direction, the separation between lower portion 350 and upper portion 340 could be vertical or in any other direction appropriate for a particular application. In the particular example shown, housing 305 also has a handle portion 370 positioned between head portion 310 and base portion 335 and configured to be grasped by the hand of a user.

A color imaging sensor 355, such as a vision camera, is positioned within base portion 335 and has a first field-of-view (FOV) 360 that is directed out of base window 345 in upper portion 340 of base portion 335. Preferably, an area adjacent a front of handle portion 370 (e.g., within 10 mm of the front of handle portion 370 or within a finger's width of the front of handle portion 370) is visible in first FOV 360, which can be used to determine if a user is gripping handle portion and possibly switch handheld barcode reader 300 between a hands-free presentation mode and a handheld scanning mode based on color sensor 355 detecting the presence or absence of the hand of the user within first FOV 360. In the example shown, color sensor 355 is configured to capture images to perform functions such as facial recognition, gesture recognition, product identification, scan avoidance, ticket switching, etc.

A barcode reading module 320 including a monochromatic sensor is positioned at least partially in head portion 310 and has a second FOV 325 that is directed through a scan window 315 in head portion 310 and can at least partially overlap first FOV 360. Further, a filtering element 245 is positioned at least partially in or adjacent to head portion 310 in line with the second FOV 325. In some implementations, the filtering element 245 is positioned such that light entering the head portion 310 passes through the filtering element 245 before passing through the scan window 315 and reaching the barcode reading module 320. In further implementations, the filtering element 245 is part of the scan window 315 or located between the scan window 315 and the barcode reading module 320 and filters the light as described above with regard to FIGS. 1A-2.

A controller 375 is also positioned within housing 305 and is in communication with barcode reading module 320 and color sensor 355. Controller 375 is configured to decode process signals from barcode reading module 320 from barcodes that are read by barcode reading module 320 and to receive and process images captured by and received from color sensor 355 for processes that do not include barcode reading, as discussed above. Controller 375 is also configured to synchronize barcode reading module 320 and color sensor 355 so that color sensor 355 does not capture images when barcode reading module 320 is active. Controller 375 can synchronize barcode reading module 320 and color sensor 355 based on images captured by color sensor 355. Alternatively, controller 375 could be configured to synchronize color sensor 355 and barcode reading module 320 to activate simultaneously so that color sensor 355 can use the same illumination as barcode reading module 320.

As best shown in FIG. 3C, in some implementations, first FOV 360 of color sensor 355 has a horizontal viewing angle 365 that is larger than the horizontal viewing angle 330 of second FOV 325 of barcode reading module 320. For example, horizontal viewing angle 365 of first FOV 360 could be between 80 degrees and 120 degrees and is preferably 100 degrees. In addition, horizontal viewing angle 330 of second FOV 325 could be between 40 degrees and 60 degrees. With horizontal viewing angle 365 of first FOV 360 of color sensor 355 being wider than horizontal viewing angle 330 of second FOV 325 of barcode reading module 320, color sensor 355 can be used as a wake-up system and controller 375 can be configured to turn on barcode reading module 320 when an object is detected in first FOV 360 of color sensor 355, before the object reaches second FOV 325 of barcode reading module 320. This allows barcode reading module 320 to be active as the object enters second FOV 325 and allows more time for barcode reading module 320 to read and decode a barcode on the object.

Although the example embodiments of FIGS. 3B-3C depict the barcode reading module 320 including a monochromatic sensor in the head portion 310 and the color sensor in the base portion 335, it will be understood that, in some implementations, the barcode reading module 320 and filter 245 are located in the base portion 335 and the color sensor 355 is located in the head portion 310. In further implementations, both the barcode reading module 320 and the color sensor 355 are located in either the head portion 310 or the base portion 335.

Figure 4A:
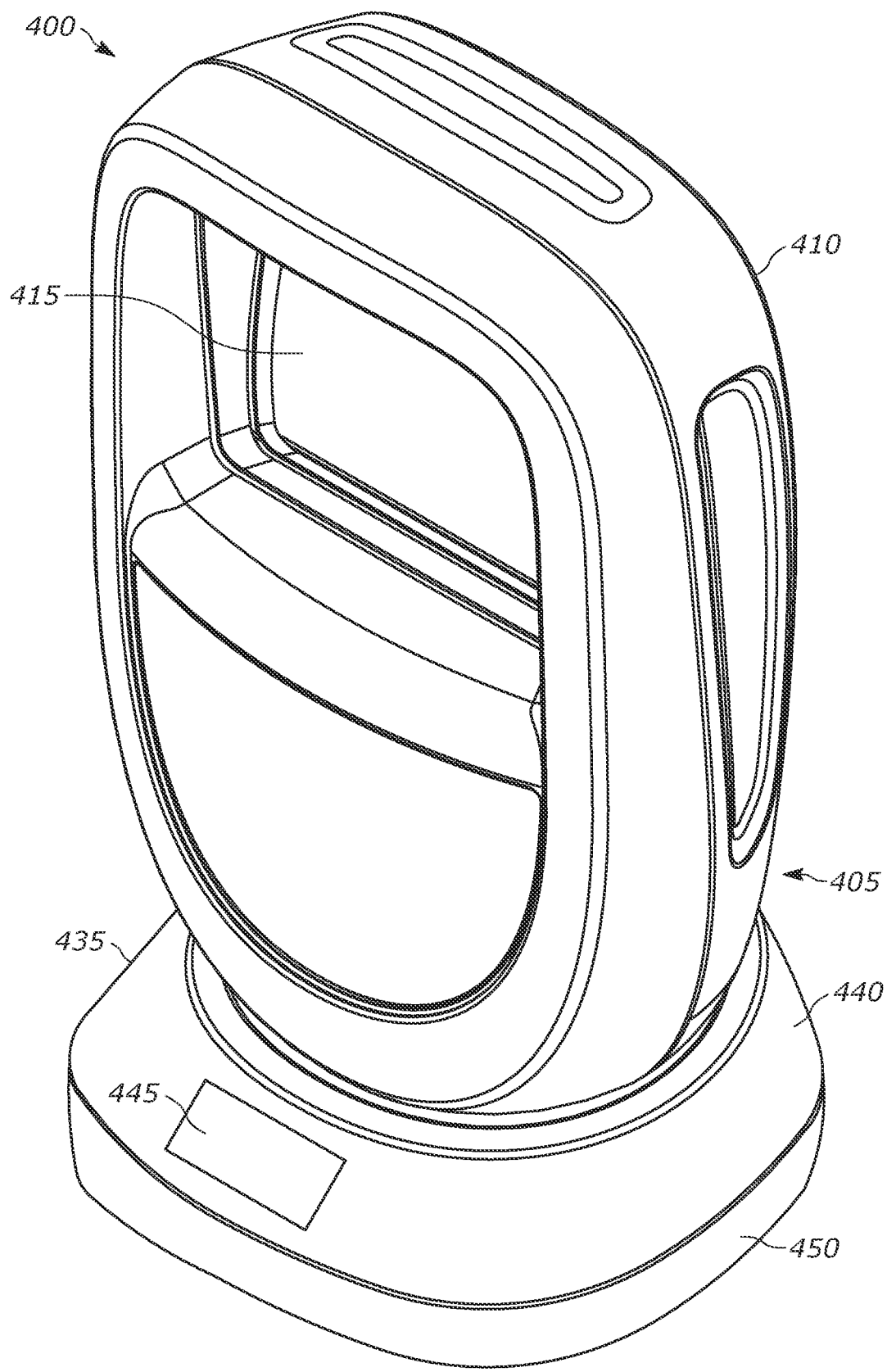
FIG. 4A illustrates a perspective view of a second example handheld barcode reader.
Figure 4B:
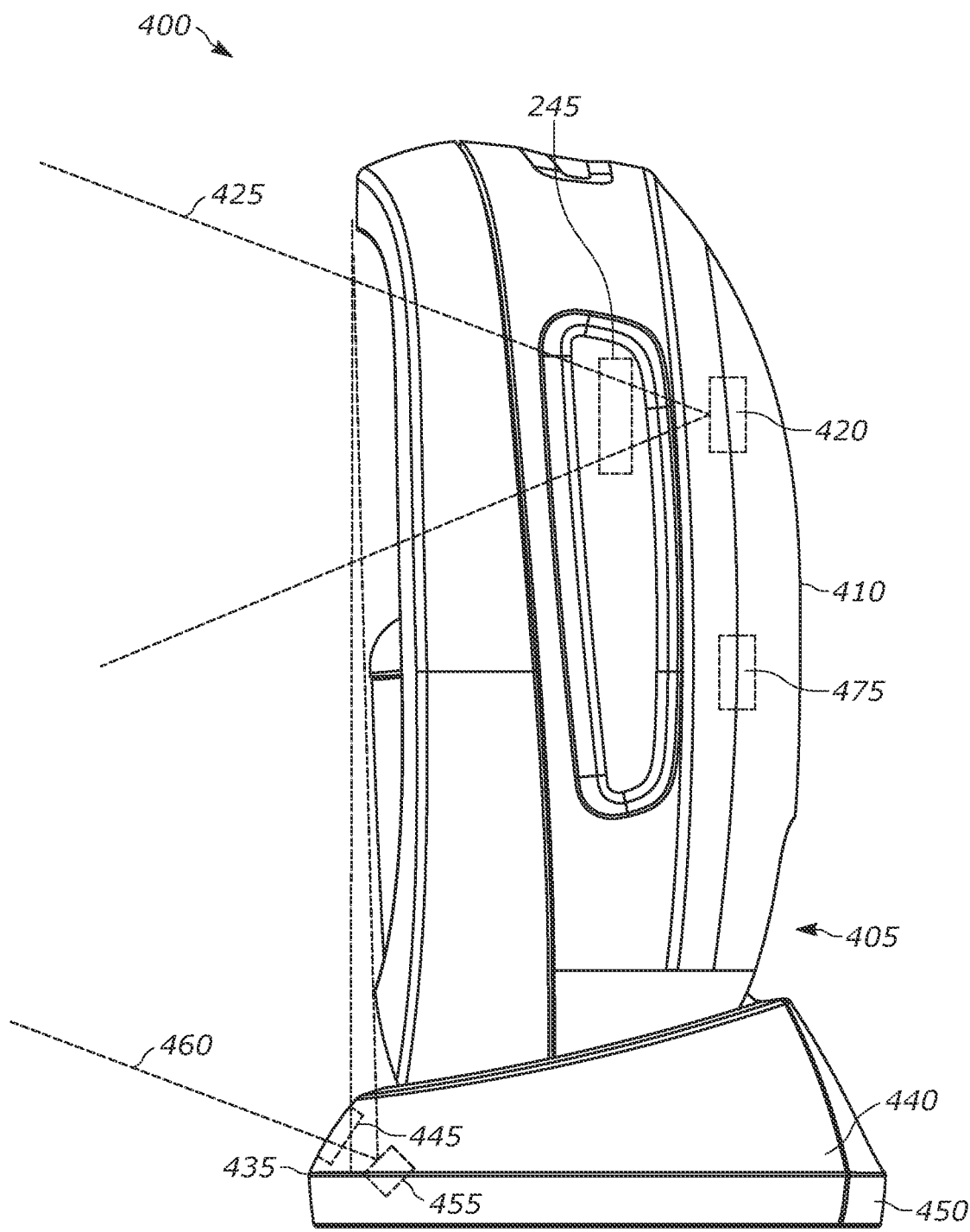
FIG. 4B illustrates a side view of the handheld barcode reader of FIG. 4A.
Figure 4C:
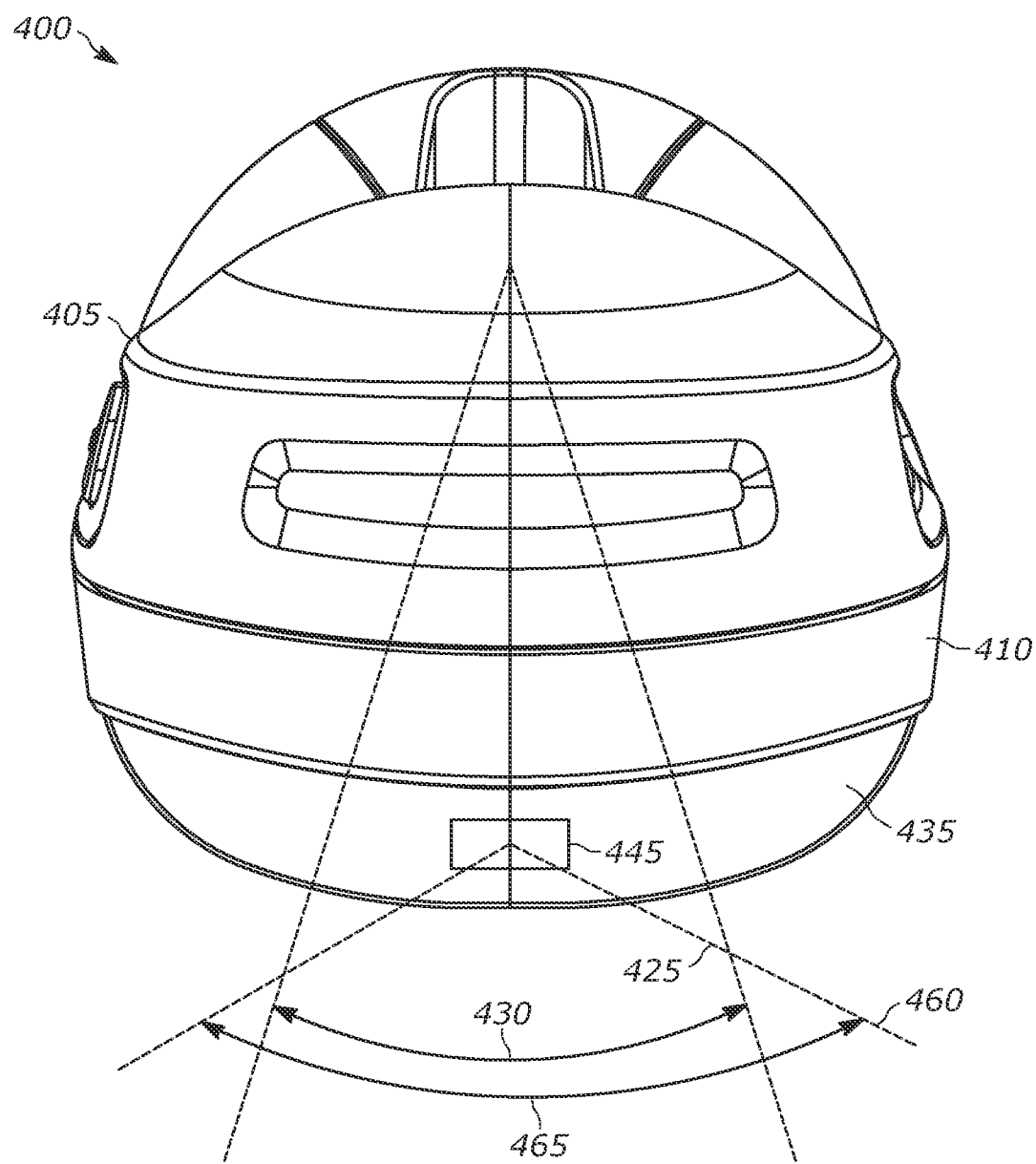
FIG. 4C illustrates a top view of the handheld barcode reader of FIG. 4A.

Referring to FIGS. 4A-4C, a second example handheld barcode reader 400 is illustrated. Handheld barcode reader 400 generally includes a housing 405 having a head portion 410 and a base portion 435. Base portion 435 includes an upper portion 440, a lower portion 450 removably attached to upper portion 440, and a base window 445 formed in upper portion 440. While lower portion 450 is shown as being separable from upper portion 440 in a horizontal direction, the separation between lower portion 450 and upper portion 440 could be vertical or in any other direction appropriate for a particular application.

A color sensor 455 is positioned within base portion 435 and has a first field-of-view (FOV) 460 that is directed out of base window 445 in upper portion 440 of base portion 435. In the example shown, color sensor 455 is configured to capture images to perform functions such as facial recognition, gesture recognition, product identification, scan avoidance, ticket switching, etc., and is not configured to capture images for decoding barcodes.

A barcode reading module 420 is positioned at least partially in head portion 410 and has a second FOV 425 that is directed through a scan window 415 in head portion 410 and can at least partially overlap first FOV 460. Further, a filtering element 245 is further positioned at least partially in head portion 410 in line with the second FOV 425. In some implementations, the filtering element 245 is positioned such that light entering the head portion 410 passes through the filtering element 245 before passing through the scan window 415 and reaching the barcode reading module 420. In further implementations, the filtering element 245 is part of the scan window 415 or located between the scan window 415 and the barcode reading module 420 and filters the light as described above with regard to FIGS. 1A-2.

A controller 475 is also positioned within housing 405 and is in communication with barcode reading module 420 and color sensor 455. Controller 475 is configured to decode process signals from barcode reading module 420 from barcodes that are read by barcode reading module 420 and to receive and process images captured by and received from color sensor 455 for processes that do not include barcode reading, as discussed above. Controller 475 is also configured to synchronize barcode reading module 420 and color sensor 455 so that color sensor 455 does not capture images when barcode reading module 420 is active. Controller 475 can synchronize barcode reading module 420 and color sensor 455 based on images captured by color sensor 455 or handheld barcode reader 400 could have an optical sensor 480 that is positioned in base portion 435, is in communication with controller 475, and has a third FOV 485 that at least partially overlaps second FOV 425 of barcode reading module 420 to determine when barcode reading module 420 is active. Controller 475 can then be configured to receive signals from optical sensor 480 indicating whether or not barcode reading module 420 is active and synchronize color sensor 455 and barcode reading module 420 (e.g., by not capturing images from color sensor 455 while barcode reading module 420 is active) based on the signals received from optical sensor 480. Alternatively, controller 475 could be configured to synchronize color sensor 455 and barcode reading module 420 to activate simultaneously so that color sensor 455 can use the same illumination as barcode reading module 420.

As best shown in FIG. 4C, in some implementations, first FOV 460 of color sensor 455 has a horizontal viewing angle 465 that is larger than the horizontal viewing angle 430 of second FOV 425 of barcode reading module 420. For example, horizontal viewing angle 465 of first FOV 460 could be between 80 degrees and 120 degrees and is preferably 100 degrees. In addition, horizontal viewing angle 430 of second FOV 425 could be between 40 degrees and 60 degrees. With horizontal viewing angle 465 of first FOV 460 of color sensor 455 being wider than horizontal viewing angle 430 of second FOV 425 of barcode reading module 420, color sensor 455 can be used as a wake-up system and controller 475 can be configured to turn on barcode reading module 420 when an object is detected in first FOV 460 of color sensor 455, before the object reaches second FOV 425 of barcode reading module 420. This allows barcode reading module 420 to be active as the object enters second FOV 425 and allows more time for barcode reading module 420 to read and decode a barcode on the object.

Although the example embodiments of FIGS. 4B-4C depict the barcode reading module 420 including a monochromatic sensor in the head portion 410 and the color sensor in the base portion 435, it will be understood that, in some implementations, the barcode reading module 420 and filter 245 are located in the base portion 435 and the color sensor 455 is located in the head portion 410. In further implementations, both the barcode reading module 420 and the color sensor 455 are located in either the head portion 410 or the base portion 435.

Figure 5:
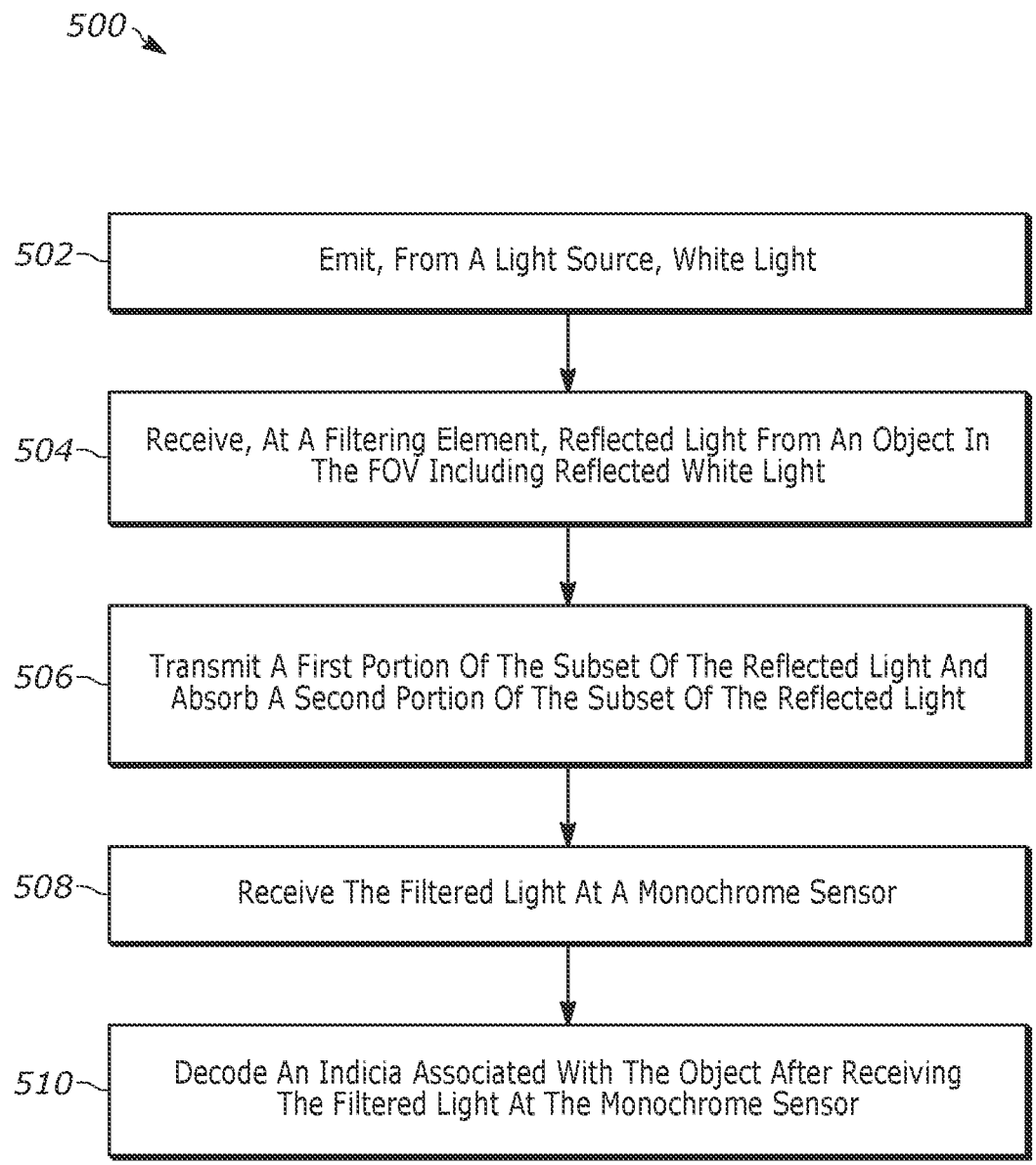
FIG. 5 illustrates a flow diagram of an example method for using filtered light received by a monochrome sensor to decode an indicia.

Referring next to FIG. 5, the method 500 illustrates a flow diagram of an example method for using filtered light received by a monochrome sensor to decode an indicia. Although the method 500 is described below with regard to imaging device 200 and components thereof as illustrated in FIG. 2, it will be understood that other similarly suitable imaging device and components may be used instead.

At block 502, the imaging device 200 emits substantially white light from a light source. In some implementations, the imaging device 200 emits substantially white light from a single source, such as a white light LED. In further implementations, the imaging device 200 emits a combination of color light from multiple light sources that combine to make and/or appear to be substantially white light, such as a red LED, a blue LED, and a green LED.

At block 504, the imaging device 200 receives, at a filtering element 245, reflected light from an object in the FOV of the imaging device, the reflected light including reflected substantially white light. In some implementations, the reflected substantially white light is and/or includes the substantially white light emitted by the imaging device 200. In further implementations, the reflected substantially white light may additionally and/or alternatively include substantially white light reflected by an object from other sources, such as natural white light. Depending on the implementation, the filtering element 245 may be any of a plastic filter, a glass filter, a sticker applied to an optical element (such as an element of imaging assembly 244), a lens coating applied to an optical element (such as an element of imaging assembly 244), a lens molded from filtering material, or a dichroic mirror along the imaging axis 246. In some implementations, the filtering element 245 is disposed to receive the reflected light in different locations within the imaging device 200. For example, the filtering element 245 may be disposed to receive the light with optical elements of the imaging assembly 244. Alternatively, the filtering element 245 may be disposed to receive reflected light before or after the imaging assembly 244 receives the light. For example, in some implementations in which the imager 241 includes both a monochrome sensor and a color sensor, as discussed above with regard to FIG. 2, the filtering element 245 is disposed such that the filtering element only filters light to the monochrome sensor while leaving the light that proceeds to the color sensor unfiltered.

At block 506, the imaging device 200 transmits a first portion of the subset of the reflected light and absorbs a second portion of the subset of the reflected light via the filtering element 245. In some implementations, the filtering element 245 is a red light filter that allows only light with wavelengths of at least 600 nm to pass while absorbing and/or reflecting light of other wavelengths. In other implementations, the filtering element 245 filters a different range of wavelengths.

At block 508, the imaging device 200 receives the filtered light at a monochrome sensor, and, at block 510, the imaging device 200 decodes an indicia associated with the object after receiving the filtered light at the monochrome sensor. In some implementations, the indicia associated with the object is a barcode, QR code, label, etc. In further implementations, the indicia is part of a larger set of indicia, such as a digital watermark comprised of multiple barcodes. In some such implementations, the digital watermark or other indicia is designed such that the digital watermark or other indicia appears invisible or nearly-invisible to the human eye but are able to be read by a monochrome sensor using a single color light (e.g., red light) or a color sensor with substantially white light.

In further implementations, the imaging device 200 further receives at least some of the reflected at a color sensor. As described with regard to FIG. 2, the color sensor may be part of an imager 241 and may be placed separately from the monochrome sensor. In some implementations, the imaging device 200 may capture a color image of the object that the imaging device 200 scans. As such, in such implementations, the color sensor receives unfiltered light. The imaging device 200 may facilitate the requirements of both the color sensor and the monochrome sensor through the use of reflective optical elements, refractive optical elements, and/ or any other such optical elements to direct, split, and otherwise manipulate the received light such that a portion passes through the filtering element 245 and the remainder does not.

In some implementations, the imaging device 200, responsive to detecting a first finder pattern associated with a non-watermark indicia associated with the object (e.g., a barcode, QR code, label, etc.), processes a first subset of the image data using a first decode operation configured to decode non-watermark indicia to obtain a first payload. Similarly, responsive to detecting a second finder pattern associated with a watermark indicia (e.g., a Digimarc® watermark) associated with the object, processing a second subset of the image data using a second decode operation configured to decode watermark indicia to obtain a second payload. Depending on the implementation, the identification and/or determination of a presence of a specific type of a barcode can occur through image analysis, in particular through analyzing the image to identify the presence of the finder pattern that further signals a presence of a particular barcode. In further implementations, the identification and/or determination of a presence of a specific type of a barcode can occur through other such methods known in the art. In implementations in which the second decode event is for a Digimarc® watermark, the second decode event is associated with a Digimarc® library. Further, depending on the implementation, the first decode operation and the second decode operation occur in a single ASIC, different ASICs, the same module, different modules, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device for imaging and decoding watermark and non-watermark barcodes, the imaging device comprising:
 a light source configured to emit output light such that the output light provides a white or off-white appearance to a user;
 an imaging assembly having a field of view (FOV) and disposed along an imaging axis to receive reflected light from an object in the FOV, the object being illuminated by the output light emitted by the light source, and the imaging assembly including:
  an optical element, disposed along the imaging axis of the imaging assembly to receive the reflected light from the object, and
  a filtering element, disposed to receive at least a subset of the reflected light, the filtering element configured to transmit a first portion of the subset of the reflected light as filtered light and absorb a second portion of the subset of the reflected light, the filtered light having a wavelength of at least 600 nm;
 a monochrome sensor disposed to receive the filtered light and to generate image data based on receiving the filtered light; and
 a microprocessor and computer-readable media storing machine readable instructions, the microprocessor configured to:
  responsive to detecting a finder pattern associated with a non-watermark barcode associated with the object, process at least a first subset of the image data using a first decode operation configured to decode the non-watermark barcode to obtain a first decoded payload; and
  responsive to detecting a finder pattern associated with a watermark barcode associated with the object, process at least a second subset of the image data using a second decode operation configured to decode the watermark barcode to obtain a second decoded payload.

2. The imaging device of claim 1, wherein the filtering element includes at least one of: a plastic filter; a glass filter; a sticker applied to the optical element; a lens coating applied to the optical element; a lens molded from filtering material; or a dichroic mirror along the imaging axis.

3. The imaging device of claim 1, wherein the optical element includes a scan window, the scan window including a section through which at least the subset of the reflected light passes.

4. The imaging device of claim 3, wherein the filtering element includes at least one of: (i) a sticker applied to the section of the scan window through which the reflected light passes, (ii) a coating applied to the section of the scan window through which the reflected light passes, and (iii) at least part of the scan window, wherein the at least part of the scan window is molded from a filtering material.

5. The imaging device of claim 1, wherein the light source comprises three illumination sources that each emit a distinct wavelength at a respective predetermined intensity and the output light is a combined output of the three illumination sources.

6. The imaging device of claim 1, wherein the watermark barcode is a digital watermark and the filtered light has a wavelength in a range of 620 nm to 750 nm.

7. The imaging device of claim 6, wherein the second decode operation is a decode operation associated with a library for the digital watermark.

8. The imaging device of claim 1, wherein the imaging device further comprises a color sensor configured to receive unfiltered light reflected from the object.

9. The imaging device of claim 8, wherein the FOV of the imaging assembly is a composite FOV comprised of a first FOV associated with the monochrome sensor and a second FOV associated with the color sensor, and further wherein the first FOV at least partially overlaps the second FOV.

10. A barcode scanning platform having a field of view (FOV) and for decoding watermark and non-watermark barcodes in the FOV, the barcode scanning platform comprising:
　a housing;
　a light source positioned at least partially within the housing and configured to emit output light such that the output light provides a white or off-white appearance to a user;
　an imaging assembly positioned at least partially within the housing, having the FOV, and disposed along an imaging axis to receive reflected light from at least one barcode in the FOV, the at least one barcode being illuminated by the output light emitted by the light source and the imaging assembly including:
　　an optical element, disposed along the imaging axis of the imaging assembly to receive the reflected light from the at least one barcode, and
　　a filtering element, disposed to receive at least a subset of the reflected light, the filtering element configured to transmit a first portion of the subset of the reflected light as filtered light and absorb a second portion of the subset of the reflected light, the filtered light having a wavelength of at least 600 nm;
　a monochrome sensor positioned at least partially within the housing and disposed to receive the filtered light and to generate image data based on receiving the filtered light; and
　a microprocessor and computer-readable media positioned at least partially within the housing and storing machine readable instructions, the microprocessor configured to:
　　responsive to detecting a finder pattern indicating that the at least one barcode is associated with a non-watermark barcode process at least a first subset of the image data using a first decode operation configured to decode the non-watermark barcode to obtain a first decoded payload; and
　　responsive to detecting a finder pattern indicating that the at least one barcode is associated with a watermark barcode, process at least a second subset of the image data using a second decode operation configured to decode the watermark barcode to obtain a second decoded payload.

11. The barcode scanning platform of claim 10, wherein the filtering element includes at least one of: a plastic filter; a glass filter; a sticker applied to the optical element; a lens coating applied to the optical element; a lens molded from filtering material; or a dichroic mirror along the imaging axis.

12. The barcode scanning platform of claim 10, wherein the optical element includes a scan window, the scan window including a section through which at least the subset of the reflected light passes.

13. The barcode scanning platform of claim 12, wherein the filtering element includes at least one of: (i) a sticker applied to the section of the scan window through which the reflected light passes, (ii) a coating applied to the section of the scan window through which the reflected light passes, and (iii) at least part of the scan window, wherein the at least part of the scan window is molded from a filtering material.

14. The barcode scanning platform of claim 10, wherein the light source comprises three illumination sources that each emit a distinct wavelength at a respective predetermined intensity and the output light is a combined output of the three illumination sources.

15. The barcode scanning platform of claim 10, wherein the watermark barcode is a digital watermark and the filtered light has a wavelength in a range of 620 nm to 750 nm.

16. The barcode scanning platform of claim 15, wherein the second decode operation is a decode operation associated with a library for the digital watermark.

17. The barcode scanning platform of claim 10, wherein the barcode scanning platform further comprises a color sensor positioned at least partially within the housing and configured to receive unfiltered light reflected from the at least one barcode.

18. The barcode scanning platform of claim 17, wherein the FOV of the imaging assembly is a composite FOV comprised of a first FOV associated with the monochrome sensor and a second FOV associated with the color sensor, and further wherein the first FOV at least partially overlaps the second FOV.

19. An imaging device for imaging a digital watermark, the imaging device comprising:
　a light source configured to emit an output light pulse and comprising three illumination sources that each emit a distinct wavelength at a respective predetermined intensity, such that a combined output of the three illumination sources causes the output light pulse to provide a white or off-white appearance to a user;
　an imaging assembly having a field of view (FOV) and disposed along an imaging axis to receive reflected light from the digital watermark in the FOV, the digital watermark being illuminated by the output light pulse, and the imaging assembly including:
  an optical element, disposed along the imaging axis of the imaging assembly to receive the reflected light from an object, and
  a filtering element, disposed to receive at least a subset of the reflected light, the filtering element configured to transmit a first portion of the subset of the reflected light as filtered light and absorb a second portion of the subset of the reflected light, the filtered light having a wavelength of at least 600 nm;
a monochrome sensor disposed to receive the filtered light and to generate image data based on receiving the filtered light; and
a microprocessor and computer-readable media storing machine readable instructions, the microprocessor configured to:
  responsive to detecting a finder pattern associated with the digital watermark, process at least a subset of the image data using a decode operation configured to decode the digital watermark to obtain a decoded payload.

20. The imaging device of claim 19, wherein the filtering element includes at least one of: a plastic filter; a glass filter; a sticker applied to the optical element; a lens coating applied to the optical element; a lens molded from filtering material; or a dichroic mirror along the imaging axis.

21. The imaging device of claim 19, wherein the optical element includes a scan window, the scan window including a section through which at least the subset of the reflected light passes.

22. The imaging device of claim 21, wherein the filtering element includes at least one of: (i) a sticker applied to the section of the scan window through which the reflected light passes, (ii) a coating applied to the section of the scan window through which the reflected light passes, and (iii) at least part of the scan window, wherein the at least part of the scan window is molded from a filtering material.

23. The imaging device of claim 19, wherein the imaging device further comprises a color sensor configured to receive unfiltered light reflected from the object.

* * * * *